July 30, 1968 J. J. KING 3,395,353

PULSE WIDTH DISCRIMINATOR

Filed April 18, 1966

INVENTOR.
JOHN J. KING
BY
H P Terry
ATTORNEY

United States Patent Office 3,395,353

Patented July 30, 1968

3,395,353

PULSE WIDTH DISCRIMINATOR

John J. King, Jericho, N.Y., assignor to Sperry Rand Corporation, a corporation of Delaware Filed Apr. 18, 1966, Ser. No. 543,430
5 Claims. (Cl. 328—63)

The present invention relates to pulse width discriminating circuits.

The present invention is particularly useful in local traffic intersection controllers for traffic control systems of the character disclosed in U.S. patent application S.N. 453,072, entitled "Traffic Intersection and Other Signal Controllers" invented by John J. King and filed May 4, 1965. As disclosed in said patent application, cycle information is transmitted from a master controller to each of the local intersection controllers by means of a pulse train wherein the occurrence of 200 pulses represents traffic signal cycle duration. In order to define the start of a background cycle, a start pulse is utilized having a width substantially greater than that of the other pulses in the pulse train. This wide pulse is the first of the 200 pulse train group and must be distinguished from the narrower pulses of the cycle data pulse train.

Prior art pulse width discriminators employ delay means, such as delay lines, as the time reference against which the data pulses are compared. Delay devices of this nature have been known to be inaccurate which might result in a fallacious discrimination of the wide pulse in the above-described system.

It is therefore a principle object of the present invention to accurately detect the occurrence of a pulse having a predetermined width.

It is another object of the present invention to detect the occurrence of a wide start pulse in a pulse train.

It is an additional object of the present invention to generate a uniformly shaped clock pulse for every cycle data pulse received.

It is a further object of the present invention to provide a guard pulse after the termination of the start output pulse to prevent malfunction.

These and other objects of the present invention are accomplished by utilizing a gated counter for the generation of the accurate time reference to which the cycle data pulses are compared.

The above and other objects will become apparent by referring to the specification and drawing wherein.

Figure 1:
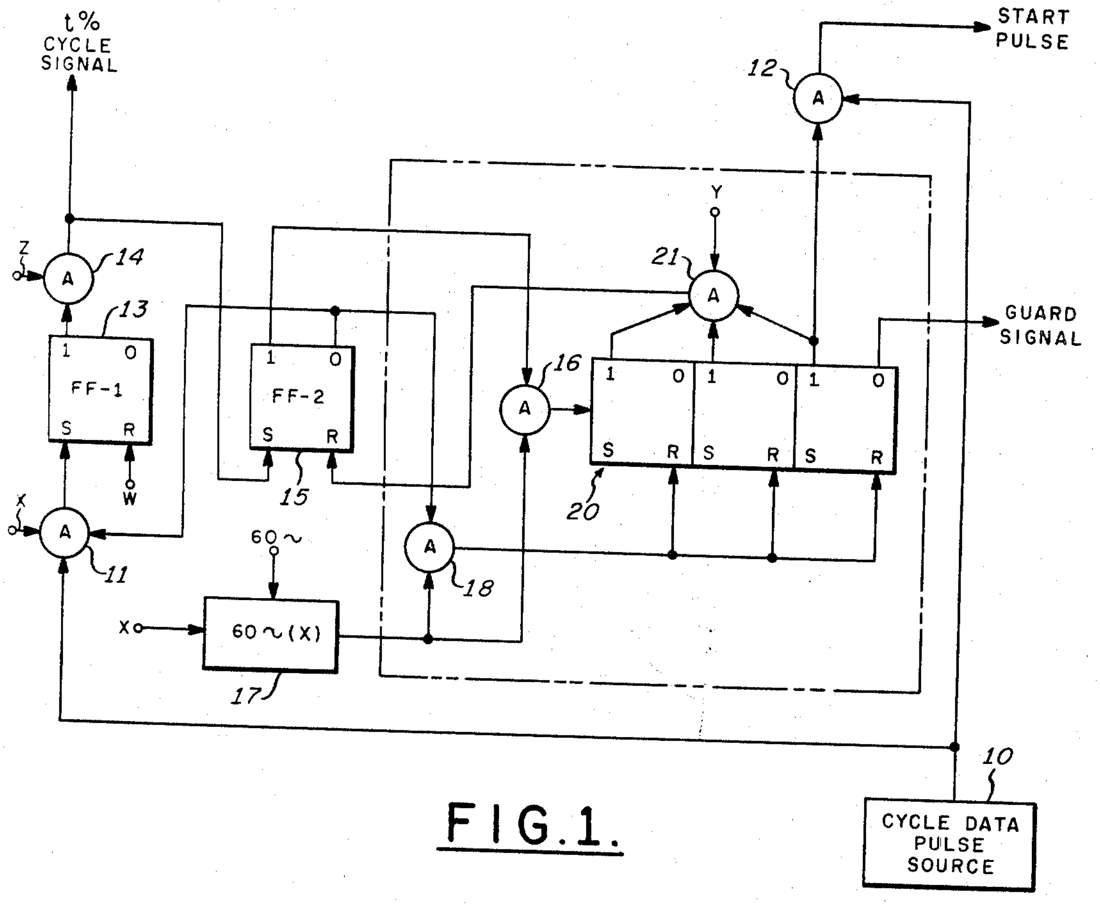
FIG. 1 is an electrical schematic diagram of the present invention.
Figure 2:
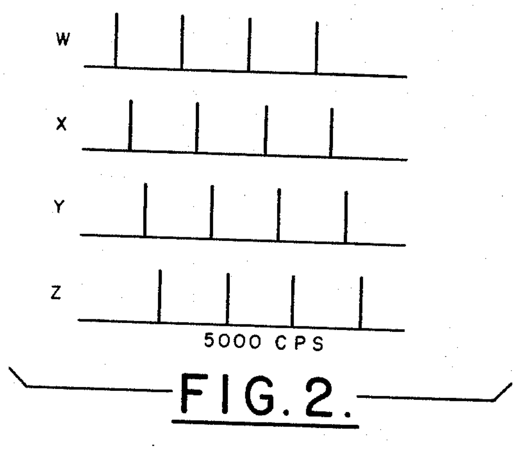
FIG. 2 is a graph showing the relationship of the pulses of a high frequency clock source.

Referring now to FIG. 1, a cycle data pulse source 10 provides a pulse train which, for example, when utilized with the traffic control system described in said U.S. patent application S.N. 453,072 comprises 200 pulses defining traffic signal cycle duration. The first pulse of the cycle pulse train is a wide start pulse approximately three times wider than the narrower pulses which comprise the remainder of the pulse train. The wide start pulse must be distinguished from the narrower pulses in order to start the background cycle as explained more fully in the aforementioned patent application. The cycle data pulses from the source 10 are connected to an input terminal of an AND gate 11 and to the input terminal of a start AND gate 12. Another input terminal of the AND gate 11 is responsive to the X pulses from a conventional high frequency clock source (not shown) which provides W, X, Y and Z pulse trains sequentially in that order as shown in FIG. 2. The output terminal of the AND gate 11 is connected to the set input terminal of a bistable flip-flop 13. The reset input terminal of the flip-flop 13 is responsive to the W pulses. The binary one state output terminal of the flip-flop 13 is connected to an input terminal of an AND gate 14 which has its other input terminal responsive to the Z pulses. The output terminal of the AND gate 14 provides *t*% cycle pulses which are used in a manner more fully described in said aforementioned patent application.

The output terminal of the AND gate 14 is also connected to a set input terminal of a bistable flip-flop 15 which has its binary one state output terminal connected to an input terminal of a counter input AND gate 16. The clock pulses occurring at X time and at a 60 cycle rate from a source 17 are connected to the other input terminal of the AND gate 16 and to an input terminal of a counter reset AND gate 18. The output terminal of the AND gate 16 is connected to the input terminal of a multistage counter 20. The binary one state output terminals of each of the stages of the counter 20 are connected to respective input terminals of an overflow AND gate 21 which has its other input terminal responsive to the Y pulses. The binary one state output terminal of the last stage of the counter 20 is also connected to the other input terminal of the start AND gate 12. The output terminal of the AND gate 12 provides a start pulse which is used as explained in the aforementioned patent application. The binary zero state output terminal of the last stage of the counter 20 provides a guard signal. The output terminal of the AND gate 21 is connected to the reset input terminal of the flip-flop 15 which has its binary zero output terminal connected to an input terminal of the AND gate 11 and to an input terminal of the AND gate 18. The output terminal of the AND gate 18 is connected to the reset input terminals of the respective stages of the counter 20.

In operation, the W pulse initially resets the flip-flop 13 to its binary zero state thereby disabling the AND gate 14. The previous output from the overflow AND gate 21 resets the flip-flop 15 to its binary zero state thereby providing a signal to the AND gates 11 and 18 while disabling the AND gate 16. With X pulses being continuously provided to the AND gate 11, when a cycle data pulse from the source 10 is applied to the AND gate 11, it is enabled thereby setting the flip-flop 13 to the binary one state and providing a signal to the AND gate 14. When a Z pulse appears, the AND gate 14 is enabled and a *t*% cycle pulse is generated which sets the flip-flop 15 to its binary one state thereby providing a signal to the counter input AND gate 16 while disabling the counter reset AND gate 18. The clock pulses occurring at X time and at a 60 cycle rate from the source 17 are now passed through the enabled AND gate 16. They are counted by the counter 20 until the start gate 12 is enabled by an enabling signal from the binary one state output of the last stage of the counter 20. If the wide cycle data start pulse from the source 10 exists, its duration will coincide with the enabling signal and the start AND gate 12 will be enabled thereby providing a start pulse from the output terminal thereof. However, if the data pulse had terminated prior to the occurrence of the enabling signal, which would be the case of any pulse narrower than the wide start pulse, then there is no output from the source 10 at the time of the enabling signal and the start AND gate 12 is not enabled. In either event, the clock pulses are counted in the counter 20 until the counter 20 is full, at which time the binary one state signals appear on the input terminals to the overflow AND gate 21. At the time of the next Y pulse, the AND gate 21 is enabled which resets the flip-flop 15 to the binary zero state thereby enabling the reset AND gate 18 and at the next 60 cycle clock pulse from the source 17, the counter 20 is reset thereby generating a guard signal from the binary zero state of the last stage of the counter 20. The system is now in the same condition that it was at the beginning of the above explanation waiting from the next data pulse.

The start output pulse from the start AND gate 12 is utilized as indicated in the aforementioned patent application to set a flip-flop in the intersection controller which allows a sequence of events to be initiated. At the conclusion of these events, the flip-flop in the intersection controller is reset. If at this time the start pulse has not been terminated, this flip-flop can be erroneously set again. The purpose of the guard pulse is to initiate the sequence of events thereby assuring that the start pulse will have terminated.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. In apparatus having data pulse source means for providing a data pulse train having wide start pulse and a plurality of narrower pulses and clock pulse source means for providing a plurality of sequential clock pulse trains, the combination comprising, (a) first gating means responsive to said data pulse train and at least one of said clock pulse trains for providing a gating signal upon coincidence thereof, (b) second gating means responsive to said gating signal and a function of said one of said clock pulse trains for providing counting pulses, (c) counting means responsive to said counting pulses for providing an enabling signal upon counting a predetermined number of said counting pulses related to the duration of said wide start pulse, and (d) third gating means responsive to said enabling signal and to said data pulse train for providing a system start pulse only when said enabling signal and said wide start pulse coincide.

2. The combination recited in claim 1 in which said counting means includes a reset function which provides a guard signal upon being reset.

3. The combination in claim 1 in which said counting means includes a multistage counter, each stage providing an output depending upon the count and further including fourth gating means responsive to the outputs of each of said stages and to another of said clock pulse trains for providing a reset signal upon simultaneous application of all of said signals, said reset signal being effective to provide a guard signal from said counting means.

4. The combination recited in claim 3 further including first flip-flop means responsive to said gating signal and to said reset signal for selectively enabling said second gating means and resetting said counting means.

5. The combination recited in claim 4 in which said first gating means includes first AND gate means responsive to said one of said clock trains, said data pulse train and a binary zero state signal from said first flip-flop means for providing a first AND gate signal, second flip-flop means responsive to said first AND gate signal for providing a binary one state signal in response to said first AND gate signal, and second AND gate means responsive to said binary one state signal and to still another of said clock pulse trains for providing said gating signal in the form of a *t*% cycle signal.

No references cited.

ARTHUR GAUSS, *Primary Examiner.*

S. D. MILLER, *Assistant Examiner.*